Patented Sept. 11, 1928.

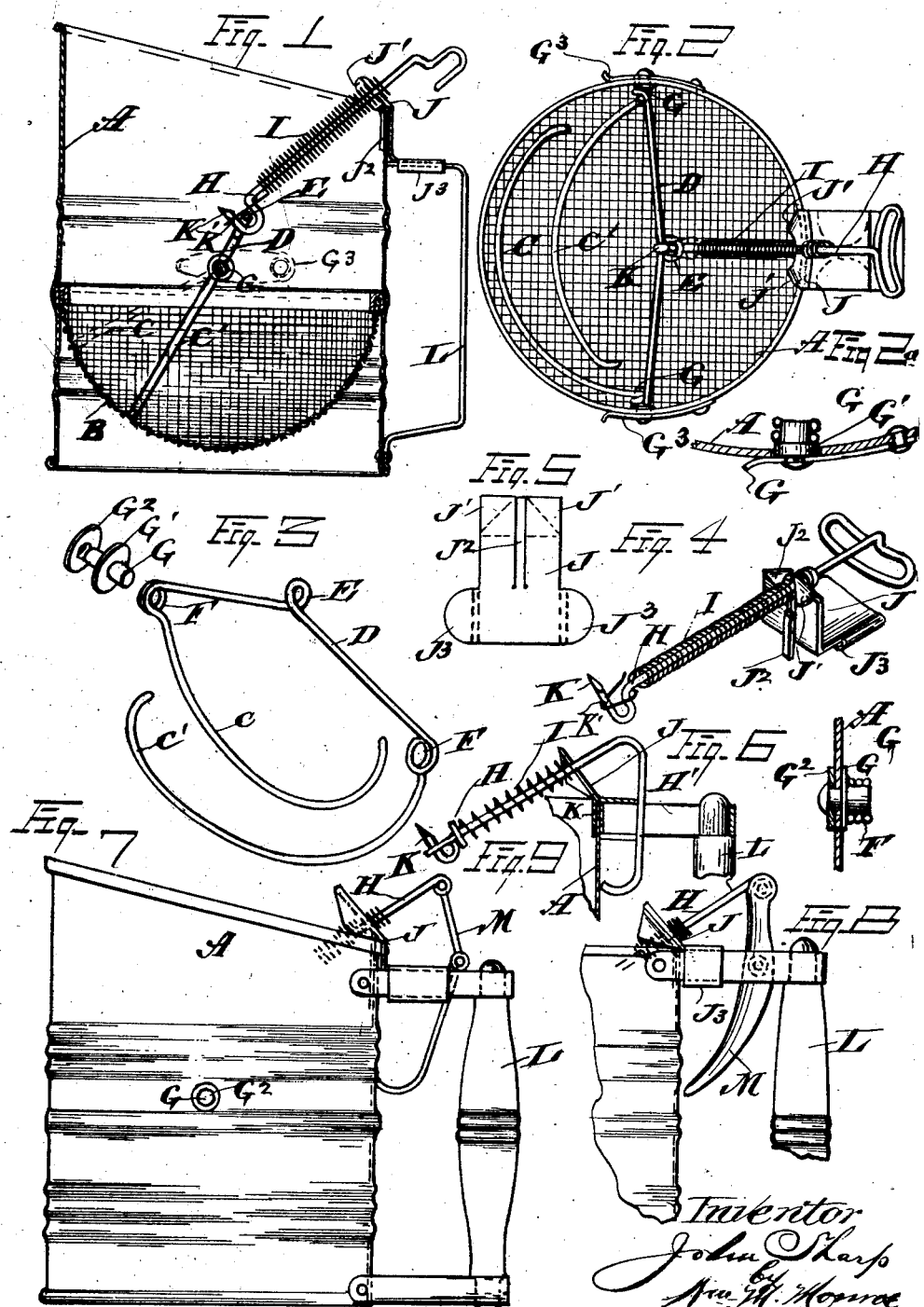

1,683,848

UNITED STATES PATENT OFFICE.

JOHN SHARP, OF CLEVELAND, OHIO.

SIFTER.

Application filed January 25, 1927. Serial No. 163,321.

The invention has reference to hand sifting devices and the particular object is to provide a sifter that can be operated with only one hand, while the other hand may be otherwise employed.

A further object is to employ a sifter having oscillating spring beater arms provided with laterally spaced free vibrating extremities that by their vibrations will break up lumps of material and will also agitate it between them thus enabling it to more readily pass through the meshes of a sieve, and also will exert an adjustable amount of pressure upon the sieve to press the finely ground material through the sieve. In this device pivotal bearings for the beater arms are enclosed within the container and no openings are left for fine material to escape, also the sieve being resilient is caused to vibrate as the spring beater arms pass backwards and forwards over it.

Also a more economical use of power is provided and a quicker and more efficient action is obtained than by the use of the well known revolving beaters, owing to the sudden reversal of movement of the free beater arms which causes them to vibrate rapidly, and exert a rubbing pressure on the material, similar to that of rubbing with the fingers, also the swift snappy action obtained by oscillating overlapping spring beaters vibrating towards and from each other over the surface of the sieve breaks up the lumps of material quickly.

The invention is exemplified in a flour sifter, and comprises the combination and arrangement with a container having a sieve in its lower end, of connected spring beater arms having their extremities free to vibrate and conforming in shape to the surface of said sieve. These beaters arms preferably extend from opposite sides of the container towards each other and their free ends are spaced apart and overlap each other and preferably lie at a slight angle to each other, thus providing a space between them in which the material is worked backwards and forwards until it is passed through the sieve. Also the spring beater arms are mounted integrally upon a common transverse member which is pivoted in the walls of the container, and is provided with an offset crank or operating arm by means of which a spring returned plunger or push rod is enabled to operate the same. Bearing pins or journals are preferably employed that are secured to the walls of the container in such a manner that no openings will remain for leakage of fine material therethrough.

The invention further consists in the combination and arrangement of parts and construction of details hereinafter described, illustrated in the accompanying drawings, and specifically pointed out in the claims.

In the accompanying drawings, Figure 1 is a vertical section of the device. Figure 2 is a plan thereof. Figure 3 is a perspective of the beater arms and crank shaft therefor. Figure 4 is a perspective of the plunger for operating the beaters; Fig. 5 is a plan of the support piece for the plunger. Figure 6 is a transverse section showing one of the beater journals and the manner of attaching it to the wall. Figure 7 is an elevation showing finger operated wire lever for actuating the plunger. Figure 8 shows a sheet metal lever for the same purpose; Figure 9 is a section showing a pulled plunger and compression return spring therefor.

In these views, A shows a cylindrical container having a concave wire sieve B at its lower end. C, C', are spring beater arms which are integrally attached to a diametrical shaft bar or member D, which is provided with a central offset eye E, serving as a crank bearing for operating the same. The beater arms extend across the container from the opposite side and are free at their outer ends and conform to the shape of the wire sieve and at their points of union with the diametrical bar are provided with bearings F, F, which serve as bearings for the journal rivets G, G, which are secured in the opposite sides of the container.

The spring beaters C, C', and their connecting bar D are rocked to give a vibrating movement to the beaters over the surface of the sieve with which they make spring contact, from one side to the other thereof, and the beaters overlap and are spaced apart preferably at an angle to each other so as to include a mass of flour between them, which is gradually pushed or rubbed through the meshes of the sieve as the beaters pass backward and forward over the same.

The ends of the beaters are free to vibrate separately and in the same or opposite directions and a quick movement is imparted to them by means of a plunger H driven forcibly by hand in one direction while an equally quick return movement is imparted by means of a coiled spring I, which may be a tension spring as shown in Figures 1, 2, 4 and 7 and 8, or a compression spring as shown in Figure 9.

The result of the quick forward and backward movements is to cause the free ends of the beaters to vibrate rapidly and act to break up the lumps in the flour so that it will pass easily through to the sieve.

In Figure 4 the plunger H is preferably mounted in a slotted guide J in which it reciprocates and oscillates vertically, and a bearing K (shown as a hook) at the inner end engages with the eye E in the offset portion of the transverse rod or bar D, which serves as a crank by means of which the beaters are oscillated. The coiled spring shown in Figures 1 and 4 is engaged with a notch K' in the hook K, at one end above the crank, and adjacent to the other end with the sides J' of the slotted guide J. The spring also locks the hook K in place. The spring can be lengthened or shortened by releasing one end from the hook and rotating it in the sides of the slot, after which the end can be again attached to the hook.

The blank from which this guide is stamped is shown in Fig. 5, the corners at J', J', being folded over, to prevent the plunger rod from coming out of the slot, and to hold and lock the spring I in place. The guide may be set upon the edge of the container and the tongue portion J² taken from the slot, may be pressed back over the side of the container.

The rounded outer extremities J³ are pressed underneath the handle L.

The journals G, G, are formed with enlargements G' that prevent them from becoming loosened from the thin metal that froms the sides of the container, and a washer G² is secured to the outer side thus sealing the opening in the can to prevent the escape of flour, and to provide a substantial bearing for the eyes F, F.

In Figures 7 and 8 a trigger lever M is shown for operating the plunger, and in Figure 9 the outer end of the plunger or push rod is bent down so as to form a trigger that can also be operated by the same hand that holds the container.

In Figures 1 and 2 and 2ª long spring washers G³, G³, are employed upon which the journals are riveted as shown in 2ᴬ. By lifting these long spring washers the journals can be withdrawn to permit the beater arms to be removed.

In the construction shown in Figure 7 the journals are immovable in the walls A and the transverse bar D is sprung slightly to enable the crank eyes F—F to be slipped over the journals G, G.

Having described in the invention what I claim as new and desire to secure by Letters Patent is:

1. In a sifter, the combination with a container, having a semi-spherical sieve adjacent to its lower end, of spring beater arms movable backwards and forwards over the surface of said sieve, a common crank connecting member for said beaters, said member being pivoted diametrically across said container, and means located in the container for oscillating said cranked member and attached spring beaters.

2. In a sifter, the combination with a container, having a semi-spherical concave sieve adjacent to its lower end, of spring beater arms movable backwards and forwards over the surface of said sieve, a common cranked shaft connecting member for said beaters, said member being pivoted diametrically across said container, and reciprocating means for oscillating said connecting member and attached spring beaters, said spring beaters being laterally spaced apart and overlapping each other, and each having one free extremity, said reciprocating means being out of the plane of the crank and oscillating means preventing the occurrence of a dead center for said crank and shaft.

3. A beating device for a sifter comprising, a bar having a lateral crank offset, between its extremities, and provided with a journal bearing at each end thereof, and downwardly curved oppositely extending spring beater attached to each extremity of said bar, said beaters having each one free extremity, and said beaters being spaced laterally apart and overlapping each other.

4. In a device of the character described, beaters formed of spring metal overlapping each other and laterally spaced apart, and having each one free extremity, a rigid connection between the other extremities of said beaters, said rigid connection being provided with a journal bearing at each end thereof, and with a crank arm intermediate of its ends, and a spring pressed plunger for operating said crank arm.

5. In a device of the character described, a casing having a sieve therein, spring beaters vibratable and pivoted in said cylinder over said sieve, a crank for operating said beaters, a plunger mounted in the wall of said cylinder, and operatively connected with said crank, and a return spring for said plunger, said spring being adjusted to prevent the occurrence of a dead center between said crank and the pivot point of said beaters.

6. In a device of the character described, a container, a bracket mounted upon one edge thereof, said bracket having a vertical slot therein, a plunger rod mounted in and movable in said slot, and a return spring for said plunger secured in the inwardly turned edges of said slot, and adjustable thereon.

7. In a device of the character described, a container, a bracket mounted upon one edge thereof, said bracket having a vertical slot therein, a plunger rod mounted in and movable in said slot and a return spring for said plunger adjustable in the inwardly turned edges of said slot, spring beaters revolvable across said container and sieve, a cranked connecting shaft therefor, the inner end of said shaft being provided with a crank bearing and the inner end of said spring being connected with said rod at a point above said crank in said shaft for the purpose set forth.

8. In a device of a character described, an oscillating beater shaft provided with a crank arm, a longitudinally movable rod for operating the same, said rod having a hook extremity engaging with said crank arm, and a return spring for said rod, one extremity of said spring being secured to said hook above said hook, and operating as a retainer for the hook in said crank.

9. In a device of a character described, an oscillating beater shaft provided with a crank arm, a longitudinally movable rod for operating the same, said rod having a hook extremity engaging with said crank arm, and a return spring for said rod, one extremity of said spring being secured to said hook and operating as a retainer for the hook in said crank, and a stationary guide for said rod, said guide comprising a holding means for said spring.

In testimony whereof I hereunto affix my signature.

JOHN SHARP.